(12) United States Patent
Wu et al.

(10) Patent No.: US 12,113,745 B2
(45) Date of Patent: Oct. 8, 2024

(54) COMMUNICATION METHOD AND COMMUNICATION APPARATUS

(71) Applicant: GUANGDONG OPPO MOBILE TELECOMMUNICATIONS CORP., LTD., Dongguan (CN)

(72) Inventors: Zuomin Wu, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 373 days.

(21) Appl. No.: 17/562,782

(22) Filed: Dec. 27, 2021

(65) Prior Publication Data
US 2022/0123906 A1 Apr. 21, 2022

Related U.S. Application Data

(63) Continuation of application No. PCT/CN2019/109398, filed on Sep. 30, 2019.

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC .......................... H04L 5/0055; H04L 1/1812
See application file for complete search history.

(56) References Cited

U.S. PATENT DOCUMENTS

| | | | |
|---|---|---|---|
| 2018/0324861 A1 | 11/2018 | Oh et al. | |
| 2021/0235258 A1* | 7/2021 | Takeda | H04W 72/53 |
| 2022/0368464 A1* | 11/2022 | Lin | H04L 1/1854 |

FOREIGN PATENT DOCUMENTS

CN 107332646 A 11/2017

OTHER PUBLICATIONS

International Search Report and Written Opinion dated Jun. 30, 2020 in International Application No. PCT/CN2019/109398. English translation is attached.
Qualcomm Incorporated."R1-1909247, Enhancements to Scheduling and HARQ operation for NR-U", 3GPP TSG RAN WG1 Meeting #98, Aug. 30, 2019 (Aug. 30, 2019), section 2.3, 19 pages.
Samsung. "R1-1908467, Harq enhancements for NR-U", 3GPP TSG RAN WG1 Meeting #98, Aug. 30, 2019 (Aug. 30, 2019), section 2.4, 8 pages.
Zte et al."R1-1908207, Discussion on scheduling and HARQ for NR-U", 3GPP TSG RAN WG1 Meeting #98, Aug. 30, 2019 (Aug. 30, 2019), section 2.1.1, 8 pages.

(Continued)

*Primary Examiner* — Won Tae C Kim
(74) *Attorney, Agent, or Firm* — Sheppard, Mullin, Richter & Hampton LLP (57) ABSTRACT

An integral-type implant includes an intraosseous implant part, a gum penetration part, and a prosthetic appliance attachment part integrated with each other to solve an aesthetic problem which is not solved in a conventional integral-type implant so that an aesthetic customized prosthetic appliance is attached and then the final prosthetic appliance is attached to the aesthetic customized prosthetic appliance.

6 Claims, 5 Drawing Sheets

(56) References Cited

OTHER PUBLICATIONS

Huawei et al. "R1-1908111, HARQ enhancement in NR unlicensed", 3GPP TSG RAN WG1 Meeting #98, Aug. 30, 2019 (Aug. 30, 2019), full text, 9 pages.

Huawei. "R1-1909806, Feature lead summary#3 of HARQ enhancements for NR-U", 3GPP TSG RAN WG1 Meeting #98, Aug. 30, 2019 (Aug. 30, 2019), full text, 29 pages.

Ericsson. "R1-1907456, HARQ and scheduling enhancements for NR-U", 3GPP TSG RAN WG1 Meeting #97, May 17, 2019, (May 17, 2019), full text, 12 pages.

NTT DOCOMO, INC."R1-1906199, Harq enhancement for NR-U", 3GPP TSG RAN WG1 Meeting #97, May 17, 2019 (May 17, 2019), full text, 8 pages.

* cited by examiner

COMMUNICATION METHOD AND COMMUNICATION APPARATUS

CROSS-REFERENCE TO RELATED APPLICATIONS

The present application is a continuation of International Application No. PCT/CN2019/109398 filed on Sep. 30, 2019, which is hereby incorporated by reference in its entirety.

TECHNICAL FIELD

The present disclosure relates to communication technology, and more particularly, to a communication method and a communication apparatus.

BACKGROUND

The $5^{th}$ Generation (5G) communication system supports dynamic feedback timing for Hybrid Automatic Repeat reQuest (HARQ). A network device can schedule a terminal device to receive a Physical Downlink Shared Channel (PDSCH) via Downlink Control Information (DCI). The DCI can further include indication information for a Physical Uplink Control Channel (PUCCH) such that the terminal device can transmit HARQ feedback information for the PDSCH via the PUCCH.

After a terminal device receives a PDSCH belonging to a HARQ process, and before the terminal device transmits HARQ feedback information for the PDSCH, the terminal device does not expect to receive another PDSCH of the HARQ process to prevent the successfully decoded PDSCH from being discarded. However, in some cases, for example, in a New Radio Unlicensed (NR-U) scenario, the terminal device may not be able to obtain an opportunity to transmit the HARQ feedback information for a long time, resulting in the HARQ process being occupied for a long time.

SUMMARY

The present disclosure provides a communication method and a communication apparatus, capable of preventing a HARQ process from being occupied for a long time.

In a first aspect, a communication method is provided. The method includes: receiving a first PDSCH within a time unit n, the first PDSCH belonging to a first HARQ process and the first PDSCH belonging to a first PDSCH group, where n is an integer greater than or equal to 0; expecting to receive no second PDSCH within a predetermined time period after the time unit n, the second PDSCH belonging to the first HARQ process; or receiving the second PDSCH, the second PDSCH belonging to the first HARQ process, the second PDSCH belonging to a second PDSCH group different from the first PDSCH group; and/or a transport block carried in the second PDSCH being different from a transport block carried in the first PDSCH.

In a second aspect, another communication method is provided. The method includes: receiving first DCI and second DCI within a time unit n, the first DCI scheduling a first PDSCH, the second DCI scheduling a second PDSCH, the first DCI containing first indication information indicating a timing of an uplink feedback resource corresponding to the first PDSCH, and the second DCI containing second indication information indicating that a timing of an uplink feedback resource corresponding to the second PDSCH is to be determined; determining, when the first PDSCH and the second PDSCH belong to a same PDSCH group, the timing of the uplink feedback resource corresponding to the second PDSCH based on a Counter Downlink Allocation Indicator (C-DAI) in the first DCI and a C-DAI in the second DCI; or determining, when the first PDSCH and the second PDSCH belong to different PDSCH groups and when the first DCI triggers feedback for the PDSCH group to which the second PDSCH belongs, a timing of an uplink feedback resource corresponding to the PDSCH group to which the second PDSCH belongs to be same as the timing of the uplink feedback resource corresponding to the first PDSCH; or determining, when the first PDSCH and the second PDSCH belong to different PDSCH groups and when the first DCI does not trigger feedback for the PDSCH group to which the second PDSCH belongs, to detect third DCI, the third DCI indicating the timing of the uplink feedback resource corresponding to the PDSCH group to which the second PDSCH belongs.

In a third aspect, another communication method is provided. The method includes: transmitting a first Physical Downlink Shared Channel (PDSCH) in a time unit n, the first PDSCH belonging to a first Hybrid Automatic Repeat reQuest (HARQ) process and the first PDSCH belonging to a first PDSCH group, where n is an integer greater than or equal to 0; refraining from transmitting a second PDSCH within a predetermined time period after the time unit n, the second PDSCH belonging to the first HARQ process; or transmitting the second PDSCH after the predetermined time period after the time unit n, the second PDSCH belonging to the first HARQ process; or transmitting the second PDSCH, the second PDSCH belonging to the first HARQ process, the second PDSCH belonging to a second PDSCH group different from the first PDSCH group; and/or a transport block carried in the second PDSCH being different from a transport block carried in the first PDSCH.

In a fourth aspect, another communication method is provided. The method includes: transmitting first Downlink Control Information (DCI) and second DCI within a time unit n, the first DCI scheduling a first Physical Downlink Shared Channel (PDSCH), the second DCI scheduling a second PDSCH, the first DCI containing first indication information indicating a timing of an uplink feedback resource corresponding to the first PDSCH, and the second DCI containing second indication information indicating that a timing of an uplink feedback resource corresponding to the second PDSCH is to be determined; determining, when the first PDSCH and the second PDSCH belong to a same PDSCH group, whether to receive HARQ feedback information corresponding to the PDSCH group to which the second PDSCH belongs according to the timing of the uplink feedback resource corresponding to the first PDSCH based on a Counter Downlink Allocation Indicator (C-DAI) in the first DCI and a C-DAI in the second DCI; or determining, when the first PDSCH and the second PDSCH belong to different PDSCH groups and when the first DCI triggers feedback for the PDSCH group to which the second PDSCH belongs, to receive HARQ feedback information corresponding to the PDSCH group to which the second PDSCH belongs according to the timing of the uplink feedback resource corresponding to the first PDSCH; or determining, when the first PDSCH and the second PDSCH belong to different PDSCH groups and when the first indication information does not trigger feedback for the PDSCH group to which the second PDSCH belongs, to transmit third DCI, the third DCI indicating the timing of the uplink feedback resource corresponding to the PDSCH group to which the second PDSCH belongs.

In a fifth aspect, a communication apparatus is provided. The apparatus can implement the functions corresponding to the method in the first aspect or the second aspect. The functions can be implemented by hardware or by hardware executing corresponding software. The hardware or software includes one or more units or modules corresponding to the above functions. In one possible design, the apparatus may be a terminal device or a chip. The apparatus may include a processing unit and a transceiving unit. When the apparatus is a terminal device, the processing unit may be a processor, and the transceiving unit may be a transceiver. The terminal device may further include a storage unit, which may be a memory. The storage unit may be configured to store instructions, and the processing unit may be configured to execute the instructions stored in the storage unit, to cause the terminal device to perform the method described in the first aspect or the second aspect. When the apparatus is a chip, the processing unit may be a processor, and the transceiving unit may be an input/output interface, a pin, a circuit, etc. The processing unit may be configured to execute the instructions stored in the storage unit to enable a terminal device containing the chip to perform the method described in the first aspect or the second aspect. The storage unit may be a storage unit (for example, a register, a cache, etc.) provided in the chip, or a storage unit provided externally to the chip (for example, a read-only memory, a random access memory, etc.).

In a sixth aspect, a communication device is provided. The apparatus can implement the functions corresponding to the method in the third aspect or the fourth aspect. The functions can be implemented by hardware or by hardware executing corresponding software. The hardware or software includes one or more units or modules corresponding to the above functions.

In one possible design, the apparatus may be a network device or a chip. The apparatus may include a processing unit and a transceiving unit. When the apparatus is a network device, the processing unit may be a processor, and the transceiving unit may be a transceiver. The network device may further include a storage unit, which may be a memory. The storage unit may be configured to store instructions, and the processing unit may be configured to execute the instructions stored in the storage unit, to cause the network device to perform the method described in the third aspect or the fourth aspect. When the apparatus is a chip, the processing unit may be a processor, and the transceiving unit may be an input/output interface, a pin, a circuit, etc. The processing unit may be configured to execute the instructions stored in the storage unit to enable a network device containing the chip to perform the method described in the third aspect or the fourth aspect. The storage unit may be a storage unit (for example, a register, a cache, etc.) provided in the chip, or a storage unit provided externally to the chip (for example, a read-only memory, a random access memory, etc.).

In a seventh aspect, a computer-readable storage medium is provided. The computer-readable storage medium stores a computer program. The computer program, when executed by a processor, causes the processor to perform the method described in the first aspect or the second aspect.

In an eighth aspect, a computer-readable storage medium is provided. The computer-readable storage medium stores a computer program. The computer program, when executed by a processor, causes the processor to perform the method described in the third aspect or the fourth aspect.

In a ninth aspect, a computer program product is provided. The computer program product includes computer program codes which, when executed by a processor, cause the processor to perform the method described in the first aspect or the second aspect.

In a tenth aspect, a computer program product is provided. The computer program product includes computer program codes which, when executed by a processor, cause the processor to perform the method described in the third aspect or the fourth aspect.

In an eleventh aspect, a computer program is provided. The computer program, when running on a computer, causes the computer to perform the method described in the first aspect or the second aspect.

In a twelfth aspect, a computer program is provided. The computer program, when running on a computer, causes the computer to perform the method described in the third aspect or the fourth aspect.

DESCRIPTION OF EMBODIMENTS

The technical solutions in the embodiments of the present disclosure will be described below with reference to the drawings in the embodiments of the present disclosure. Obviously, the described embodiments are a part of the embodiments of the present disclosure, not all of the embodiments. Based on the embodiments in the present disclosure, all other embodiments obtained by those of ordinary skill in the art without inventive efforts shall fall within the scope of the present disclosure.

The technical solutions according to the embodiments of the present disclosure can be applied to various communication systems, including for example: Global System of Mobile Communication (GSM), Code Division Multiple Access (CDMA) system, Wideband Code Division Multiple Access (WCDMA) system, Long Term Evolution (LTE) system, LTE Frequency Division Duplex (FDD) system, LTE Time Division Duplex (TDD) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), the further 6G system, or other communication systems.

Generally, communication systems in the related art can support a limited number of connections and are easy to implement. However, with the development of communication technology, mobile communication systems will support not only communication in the related art, but also e.g., Device to Device (D2D) communication, Machine to Machine (M2M) communication, Machine Type Communication (MTC), Vehicle to Vehicle (V2V) communication, etc. The embodiments of the present disclosure can also be applied to these communication systems.

The communication system of an alternative embodiment of the present disclosure may also be applied to a Carrier Aggregation (CA) scenario, a Dual Connectivity (DC) scenario, a Standalone (SA) network deployment scenario, and the like.

Figure 1:
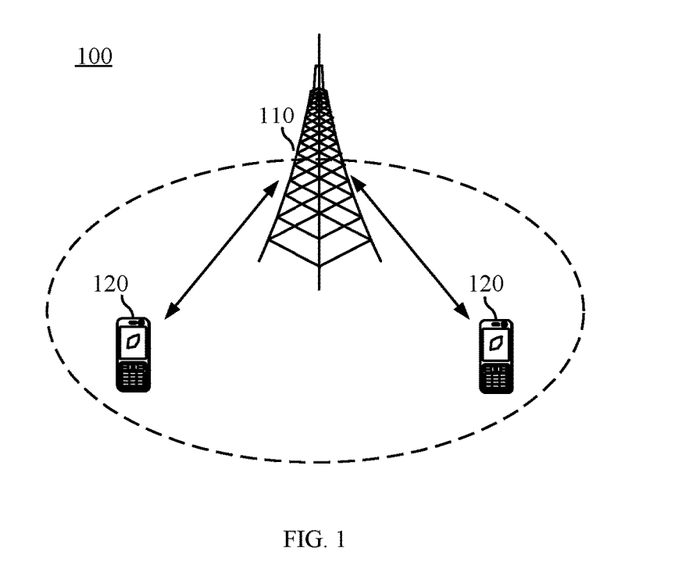
FIG. 1 is a schematic diagram showing a communication system where the present disclosure can be applied.

FIG. 1 is a schematic diagram illustrating a possible wireless communication system 100 where an embodiment of the present disclosure can be applied. The wireless communication system 100 may include a network device 110. The network device 110 may provide communication coverage for a particular geographic area, and may communicate with terminal devices located in the coverage area.

In at least one embodiment, the network device 110 may be a base station such as Base Transceiver Station (BTS) in a GSM system or a CDMA system, a base station such as NodeB (NB) in a WCDMA system, a base station such as Evolutional NodeB (eNB or eNodeB) in an LTE system, or a radio controller in a Cloud Radio Access Network (CRAN). Alternatively, the network device 110 may be a relay station, an access point, a vehicle-mounted device, a wearable device, a future network side device, or a network device in a future evolved Public Land Mobile Network (PLMN).

The wireless communication system 100 further includes at least one terminal device 120 located within the coverage range of the network device 110.

The terminal device 120 may be mobile or fixed.

In at least one alternative embodiment, the terminal device 120 may be, for example, a User Equipment (UE), an access terminal, a user unit, a user station, a mobile station, a remote station, a remote terminal, a mobile device, a user terminal, a terminal, a wireless communication device, a user agent, or a user device. Alternatively, the terminal device 120 can be a cellular phone, a cordless phone, a Session Initiation Protocol (SIP) phone, a Wireless Local Loop (WLL) station, a Personal Digital Assistant (PDA), a handheld device or a computing device having a wireless communication function, another processing device connected to a wireless modem, a vehicle-mounted device, a wearable device, a terminal device in a future 5G network, or a terminal device in a future evolved PLMN, etc. The embodiment of the application is not limited to any of these examples. In at least one alternative embodiment, direct communication, such as Device to Device (D2D) communication, may be performed between the terminal devices 120.

The network device 110 may provide services for a cell, and the terminal device 120 may communicate with the network device 110 over transmission resources, e.g., frequency domain resources or frequency spectral resources, used in the cell. The cell may be a cell corresponding to the network device 110. The cell may belong to a macro base station or a base station corresponding to a small cell. The small cell here may include a metro cell, a micro cell, a pico cell, a femto cell, or the like. These small cells have characteristics such as small coverage range and low transmission power, and are suitable for providing high-rate data transmission services.

FIG. 1 exemplarily illustrates one network device and two terminal devices, but the present disclosure is not limited to this. The wireless communication system 100 may include multiple network devices, and other numbers of terminal devices may be included within the coverage range of each network device. In addition, the wireless communication system 100 may also include other network entities such as a network controller and a mobility management entity.

The communication system 100 is only an example, and the communication system where the present disclosure can be applied is not limited to this. For example, the number of network devices and the number of terminal devices included in the communication system 100 may be other numbers. The technical solutions of the present disclosure will be described below with reference to an example in which the communication system 100 is a 5G communication system. For simplicity, the terminal devices and network devices will be described below without reference numerals.

The downlink data transmission in the 5G mobile communication system supports Semi-Persistent Scheduling (SPS) and dynamical scheduling for PDSCH. For downlink data transmission, HARQ is an efficient transmission mechanism. On the one hand, the reliability of downlink data transmission can be greatly improved by means of retransmission. On the other hand, a network device determines whether to retransmit according to an acknowledgement (ACK) or negative acknowledgement (NACK) feedback from a terminal device. The network device typically retransmits when the terminal device feeds back a NACK, thereby improving the data transmission efficiency. In the present disclosure, ACK or NACK is collectively referred to as feedback information, or HARQ feedback information, or HARQ-ACK feedback information.

In the 5G communication system, a network device can transmit a plurality of PDSCHs overlapping or non-overlapping in the time domain to a terminal device within a time unit, and the network device can also transmit one or more PDSCHs to the terminal device on a plurality of carriers, which increase the complexity of the terminal device's feedback of ACK/NACK on a PUCCH. Therefore, the ACK/NACK fed back by the terminal device on the PUCCH within a time unit may correspond to PDSCH occasions at a plurality of time domain positions or on a plurality of carriers.

Here, two concepts ("time unit" and "carrier") as used in the present disclosure will be introduced briefly.

The time domain resources used for wireless communication between a network device and a terminal device can be divided into a plurality of time units, which, in the present disclosure, may be continuous or non-continuous (i.e., there is a predetermined time interval between some neighboring time units).

The present disclosure is not limited to any length of the time unit. For example, one time unit may be one or more sub-frames, one or more time slots, or one or more symbols. Here, a symbol may also be referred to as a time domain symbol, which may be an Orthogonal Frequency Division Multiplexing (OFDM) symbol or a Single Carrier Frequency Division Multiple Access (SC-FDMA) symbol.

The carrier as used in the present disclosure may also be referred to as a frequency band, a Component Carrier (CC), a Bandwidth Part (BWP), or a cell. Alternatively, the carrier may have other names.

A carrier set can include one or more CCs, or one or more BWPs. Here, one CC may contain a plurality of BWPs, and Sub-Carrier Spacings (SCSs) between different BWPs may be same or different.

The 5G communication system supports two kinds of HARQ codebook configurations. A HARQ codebook can be understood as a set of ACKs/NACKs corresponding to PDSCHs that needs to be fed back in a certain uplink time unit (or a set of HARQ feedback information). A HARQ codebook has two meanings: 1) ACKs/NACKs for which PDSCHs are contained in the HARQ codebook, and 2) an order of the ACKs/NACKs of these PDSCHs in the codebook. The above two kinds of HARQ codebooks include dynamic codebooks and semi-static codebooks.

The dynamic codebook is also referred to as Type 2 codebook. The terminal device detects a Physical Downlink Control Channel (PDCCH) at each PDCCH monitoring occasion, obtains DCI, and determines the ACK/NACK feedback time slot corresponding to the PDSCH scheduled by the DCI based on a time domain resource allocation field and a HARQ timing indicator (PDSCH-to-HARQ-timing-indicator) field in the DCI. The terminal device first determines a time slot number of the PDSCH based on a time slot number of the PDCCH and a time slot offset value (K0) from the PDCCH to the PDSCH contained in the time domain resource allocation field, and then based on the HARQ timing indicator field obtains a timing offset (K1), i.e., a offset value from the time slot of the PDSCH to the feedback time slot corresponding to the PDSCH, so as to determine in which time slot to transmit the ACK/NACK.

Then, the terminal device determines the codebook in the feedback time slot based on Downlink Assignment Index (DAI) information contained in all PDCCHs pointing to the same feedback slot. For example, the terminal device determines the number of PDSCHs based on the DAIs contained in the received DCI format 1_0 or DCI format 1_1, and determines to transmit the ACKs/NACKs for the PDSCHs in time slot n based on the time domain resource allocation field and the HARQ timing indicator field in the DCI format 1_0 or DCI format 1_1. Then, the terminal device generates a dynamic codebook based on reception statuses of the PDSCHs. Here, the DCI format 1_0 can also be referred to as fallback DCI, which indicates that whether each bit field in DCI is present or not, the width of each bit field, and the physical layer parameter value corresponding to each value are all predefined, which do not need to be configured via higher layer signaling. The DCI format 1_1 can also be referred to as normal DCI, and the bit fields contained in the normal DCI can be added or removed by means of higher layer signaling configuration, and the width and value meaning of the bit fields can also be configured via high layer signaling. Generally, the fallback DCI is used for downlink data scheduling before a user completes the initial access (i.e., when no higher layer parameters have been obtained), or downlink data scheduling during a higher layer parameter change process (or higher layer parameter fuzzy period). In the above "fuzzy period", the network device is not sure whether the terminal device has received the updated higher layer parameters, or the terminal device has received the updated higher layer parameters, but is not sure whether the network device knows that the terminal device has received the updated higher layer parameters.

Both the DCI format 1_0 and the DCI format 1_1 contain the HARQ timing indicator field. The size of this field is typically three bits, indicating the timing offset K1 between the transmission slot of the PDSCH and the corresponding feedback slot, with a value range of "000"~"111". The specifically indicated K1 value may be configured by Radio Resource Control (RRC) signaling or predefined. For the normal DCI, the RRC signaling configures 8 values out of 16 values, corresponding to "000"~"111", and for the fallback DCI, the predefined 8 values are 1 to 8.

The semi-static codebook is also referred to as Type 1 codebook. The network device configures a K1 set and a time domain resource allocation table for the terminal device by means of protocol pre-definition or higher layer signaling. The terminal device determines a candidate time domain position of the PDSCH based on the time domain resource allocation table, and determines the time slot where the feedback information for the PDSCH may be located based on the candidate time domain position of the PDSCH and the K1 set. In each uplink time slot, the terminal device determines a set of PDSCH occasions associated with the uplink time slot, i.e., an downlink time slot associated with a set of PDSCH occasions in the downlink time slot, based on the candidate time domain position of the PDSCH and the K1 set, and then generates the feedback codebook based on the associated set of PDSCH occasions.

For a licensed carrier, after the terminal device receives a PDSCH of a HARQ process, the terminal device does not expect to receive another PDSCH transmitted using the same HARQ process before the transmission of the feedback information corresponding to the HARQ process ends.

When the NR system is applied to the unlicensed frequency band, it can support independent network deployment, that is, it does not rely on the carrier on the licensed frequency band to provide assisting services. In this scenario, after receiving a PDSCH on the unlicensed carrier, the terminal device needs to transmit the feedback information corresponding to the PDSCH (or the ACK/NACK corresponding to the PDSCH) on the unlicensed carrier.

Currently, in the unlicensed frequency band, as an alternative to indicating the time domain position of the uplink feedback resource corresponding to the PDSCH, the HARQ timing indicator field may indicate that the time domain position of the uplink feedback resource corresponding to the PDSCH has not been determined temporarily. For example, the pre-configured HARQ timing set may include a value kL indicating an invalid resource. When the HARQ timing indicator field indicates the invalid value kL, in the HARQ timing set, it means that the time domain resource of the uplink feedback resource corresponding to the PDSCH cannot be determined temporarily.

In order to flexibly feed back the HARQ information corresponding to the PDSCHs on the unlicensed frequency band, the network device can divide the scheduled PDSCHs into groups and indicate the group information of the PDSCHs via signaling, such that the terminal device provide the feedback according to different groups after receiving the PDSCHs. If a certain group of feedback information from the terminal device fails to be transmitted due to the failure of Listen Before Talk (LBT), or if the network device fails to detect the feedback information expected to be transmitted by the terminal device on the uplink feedback resource such as PUCCH, the network device can trigger the terminal device to retransmit the group of feedback information via DCI. Here, the terminal device may use a codebook of the same size as the codebook for the initial transmission when retransmitting the feedback information, or may add new PDSCH feedback information to the codebook for the retransmission.

If a HARQ timing indicator field corresponding to a PDSCH belonging to a first PDSCH group indicates an invalid value (non-numerical value), then the feedback timing (HARQ-ACK timing) corresponding to the PDSCH can be obtained from the next DCI. Here the next DCI is DCI that schedules another PDSCH, contains the HARQ timing indicator field indicating a valid value (numerical value), and triggers the first PDSCH group to provide the feedback.

On the unlicensed carrier, when the network device schedules a HARQ process transmission and indicates the corresponding uplink feedback resource for the HARQ process transmission, if the network device does not receive an ACK or NACK on the uplink feedback resource, one possible reason may be that the terminal device did not receive the scheduling information for the HARQ process, or another possible reason may be that the terminal device did not obtain access to the feedback resource due to LBT failure and thus cannot transmit on the feedback resource. There is also another possible reason that the network device has low channel quality and fails to detect the ACK or NACK transmitted on the uplink feedback resource.

Figure 2:
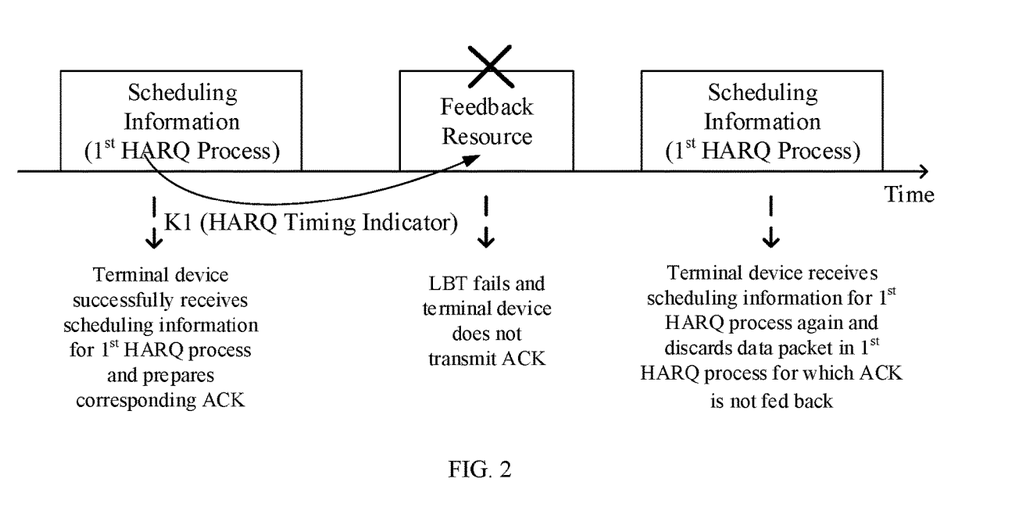
FIG. 2 is a schematic diagram showing a communication scenario according to the present disclosure.

As illustrated in FIG. 2, after receiving the scheduling information for the first HARQ process, the terminal device determines the timing of the feedback resource according to the scheduling information, and prepares to provide a feedback on the feedback resource. Then, the terminal device performs LBT, and if the LBT fails, the terminal device cannot transmit any ACK or NACK on the feedback resource.

If the assumption for the licensed carrier is reused for the unlicensed carrier, the following situation may occur: the terminal device has received and correctly decoded the PDSCH of the first HARQ process, but the terminal device fails repeatedly in a number of LBT attempts and cannot transmit the feedback information corresponding to the first HARQ process. The network device cannot schedule the first HARQ process for retransmission or new transmission as it has not received the expected feedback information. This will cause the transmission efficiency to be greatly degraded.

The present disclosure provides a communication method, which can prevent the HARQ process from being occupied for a long time.

Figure 3:
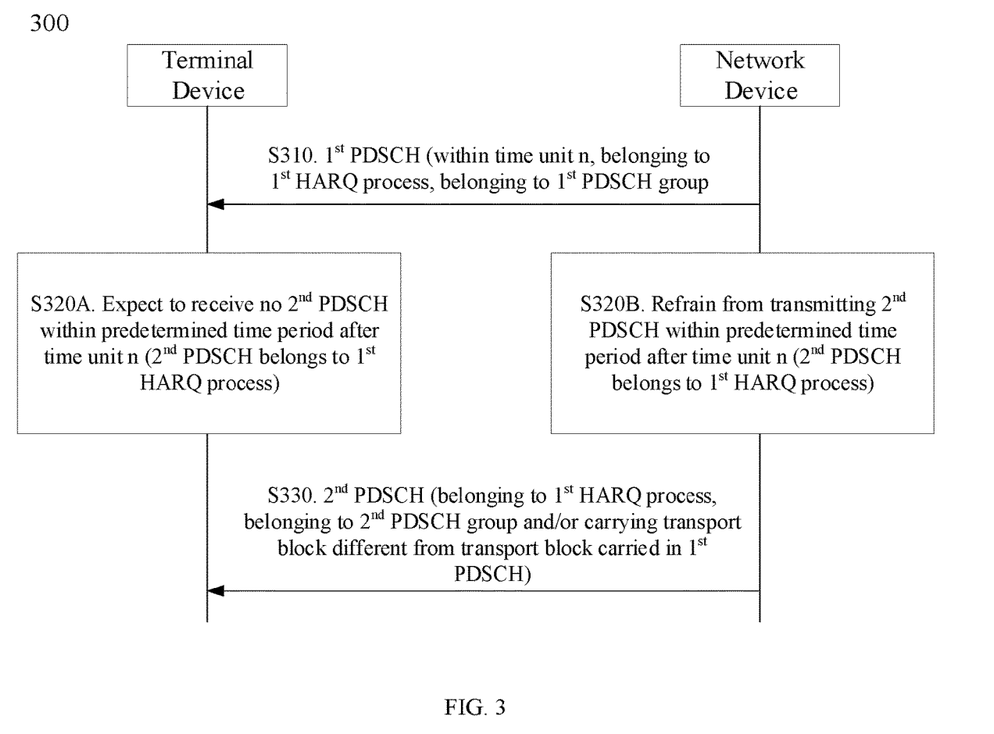
FIG. 3 is a schematic diagram showing a communication method according to the present disclosure.

As shown in FIG. 3, the method 300 includes at least part of the following content.

At S310, a terminal device receives a first PDSCH within a time unit n. The first PDSCH belongs to a first HARQ process and the first PDSCH belongs to a first PDSCH group. Here n is an integer greater than or equal to 0.

Correspondingly, the network device transmits the above first PDSCH in the time unit n.

Taking the terminal device as an example, if the terminal device does not receive scheduling information for the first HARQ process, the terminal device will not transmit feedback information. If the terminal device receives the scheduling information for the first HARQ process, it can determine a feedback resource and then transmit the feedback information.

For example, when DCI received by the terminal device includes a valid time domain resource allocation field and a HARQ timing indicator field, and the two fields indicate that a time unit n+k is a time unit where the feedback resource is located, the terminal device can determine the time unit n+k as the time unit for transmitting the feedback information for the first PDSCH group, where k is an integer greater than or equal to 0.

The terminal device, when using a licensed carrier, can directly transmit the feedback information within the time unit n+k, and the terminal device, when using an unlicensed carrier, can transmit the feedback information within the time unit n+k after an LBT succeeds.

The terminal device may also perform the following steps after receiving the first PDSCH.

At S320A, the terminal device does not expect to receive a second PDSCH within a predetermined time period after the time unit n. The second PDSCH belongs to the first HARQ process.

Or, at S330, the terminal device receives the second PDSCH, the second PDSCH belongs to the first HARQ process, the second PDSCH belongs to a second PDSCH group different from the first PDSCH group; and/or a transport block carried in the second PDSCH is different from a transport block carried in the first PDSCH.

Correspondingly, the network device can perform the following steps after transmitting the first PDSCH.

At S320B, the network device refrains from transmitting the second PDSCH within the predetermined time period after the time unit n. The second PDSCH belongs to the first HARQ process.

Or, at S330, the network device transmits the second PDSCH, the second PDSCH belongs to the first HARQ process, the second PDSCH belongs to the second PDSCH group different from the first PDSCH group; and/or the transport block carried in the second PDSCH being different from the transport block carried in the first PDSCH.

If the network device schedules the first HARQ process for transmission, and indicates the corresponding feedback resource for the first HARQ process, the network device expects to receive the feedback information transmitted by the terminal device on the feedback resource within the predetermined time period after the time unit n.

If the network device receives an ACK or NACK on the indicated feedback resource within the predetermined time period, the network device assumes that the terminal device has received the scheduling information for the first HARQ process and transmitted the feedback on the feedback resource according to a decoding result. Therefore, after receiving the feedback information transmitted by the terminal device on the above feedback resource, the network device can schedule the first HARQ process for a new transmission or retransmission according to the feedback information, without waiting for the predetermined time period to lapse, thereby reducing data transmission delay. Correspondingly, if the terminal device successfully transmits the feedback information for the first PDSCH before the end of the predetermined time period, the terminal device may expect to receive the second PDSCH belonging to the first HARQ process before the end of the predetermined time period.

If the network device does not receive an ACK or NACK on the indicated feedback resource within the predetermined time period, for example, if the terminal device fails to receive the scheduling information for the first HARQ process, or the terminal device, when using an unlicensed carrier, fails in LBT, or the terminal device successfully transmits the feedback information but the network device fails to receive it, the network device can assume that the terminal device has not received the scheduling information for the first HARQ process. Therefore, the network device can reschedule the first HARQ process for a new transmission or retransmission after the predetermined time period, thereby preventing the first HARQ process from being occupied for a long time.

Correspondingly, the terminal device does not expect to receive the second PDSCH belonging to the first HARQ process before the end of the predetermined time period.

In at least one alternative embodiment, "not expect to receive" as used above may be interpreted as: if the terminal device receives the second PDSCH belonging to the first HARQ process within the predetermined time period, it discards the second PDSCH.

The predetermined time period may be predetermined time starting from the time unit n, or predetermined time starting after the time unit n, e.g., predetermined time starting from the end of the time unit n, or predetermined time starting from the time unit n+k.

The predetermined time period can be time pre-configured at manufacture of the terminal device, time configured by the network device via signaling, or time determined by the terminal device itself. The present disclosure is not limited to any specific way the terminal device determines the predetermined time period.

If the terminal device determines to transmit the feedback information for the first PDSCH within the time unit n+k, the terminal device can start timing from the time unit n or from the time unit n+k, and after the predetermined time period lapses, detect a PDSCH belonging to the first HARQ process (for example, the second PDSCH). Here, if the terminal device starts timing from the time n, the time length of the predetermined time period may be a time interval between the time unit n and the time unit n+k. That is, the terminal device may expect to receive the second PDSCH after the transmission occasion for the feedback information for the first PDSCH, so as to avoid the waste of resource as a result of discarding the successfully decoded PDSCH, while preventing the first HARQ process from being occupied for a long time.

If the terminal device is not sure about the timing for transmitting the feedback information for the first PDSCH, the terminal device may start timing from the time unit n.

For example, the time unit n may be time slot 0, and the time unit n+k may be time slot 2. The predetermined time period can be the time period starting timing from time slot 0 or the time period starting timing from time slot 2. If the predetermined time period starts timing from time slot 0, the predetermined time period can start timing from the end of time slot 0, or from the start of time slot 0, or from a certain symbol in time slot 0 (the start symbol or the end symbol for the terminal device to receive the first PDSCH). If the predetermined time period starts timing from time slot 2, the predetermined time period can start timing from the start of time slot 2, or from the end of time slot 2, or from a certain symbol in time slot 2 (the start symbol or the end symbol of the uplink feedback resource, such as a first PUCCH, for the terminal device to transmit feedback information, such as).

If the terminal device starts timing from the end of time slot 0, the predetermined time period can be the time period from the end of time slot 0 to the end of time slot 2. Alternatively, the predetermined time period can also be a longer time. For example, the predetermined time period may be the time period from the end of time slot 0 to the end of time slot 4 (i.e., time unit n+k+m), where time slot 4 is another time unit for transmitting the feedback information for the first PDSCH group. After the terminal device fails in the LBT in the time unit n+k, it can perform the LBT again in the time unit n+k+m, and expects to transmit the feedback information for the first PDSCH group within the time unit n+k+m. In the present disclosure, the time length of the predetermined time period may be greater than or equal to the interval from the time unit n to the time unit where the first feedback resource (the resource for transmitting the feedback information for the first PDSCH) is located.

If the terminal device fails in LBT within the predetermined time period, it may receive the second PDSCH belonging to the first HARQ process after the predetermined time period, and there are no limitations on the characteristics of the second PDSCH (for example, group identifier, NH, and NDI).

Correspondingly, if the network device fails to receive the feedback information for the first PDSCH within the predetermined time period, the network device may transmit the second PDSCH belonging to the first HARQ process after the predetermined time period.

In at least one alternative embodiment, if the terminal device receives the second PDSCH after the predetermined time period, the decoding result of the first PDSCH may be discarded, or the buffer for the first PDSCH may be cleared. In addition, even if the decoding result of the first PDSCH has not been fed back, the terminal device can also discard the decoding result of the first PDSCH.

In at least one alternative embodiment, if the network device fails to receive the feedback information for the first PDSCH within the predetermined time period, the network device may transmit the second PDSCH belonging to the first HARQ process after the predetermined time period. The transport block carried in the second PDSCH may be the same as the transport block carried in the first PDSCH. Correspondingly, if the terminal device receives the second PDSCH after the predetermined time period, it can determine that the transport block in the second PDSCH is a retransmission of the transport block in the first PDSCH, and the decoding result of the first PDSCH has been obtained as ACK. In this case, the terminal device can determine that the decoding result of the second PDSCH is ACK.

If the terminal device transmits the feedback information for the first PDSCH belonging to the first HARQ process to the network device at least once before the end of the predetermined time period, the network device may also transmit the second PDSCH belonging to the first HARQ process before the end of the predetermined time period. Here, the second PDSCH needs to satisfy at least one of the following two conditions:

Condition 1: the second PDSCH belongs to the second PDSCH group different from the first PDSCH group.

Condition 2: the transport block carried in the second PDSCH is different from the transport block carried in the first PDSCH. For example, the second PDSCH may carry newly transmitted data.

The terminal device can determine whether the second PDSCH satisfies the above conditions based on the scheduling information. If the second PDSCH satisfies the above conditions, it means that at least one instance of the feedback information for the first PDSCH transmitted by the terminal device has been received by the network device. Therefore, the terminal device can discard the decoding result of the first PDSCH or clear the buffer for the first PDSCH. Therefore, the above solution can prevent the first HARQ process for which the HARQ feedback has been successfully performed from being occupied for a long time.

The terminal device may determine that the second PDSCH group is different from the first PDSCH group according to one of the following two conditions:

Condition 3: a group identifier of the second PDSCH group is different from a group identifier of the first PDSCH group.

Condition 4: the group identifier of the second PDSCH group is same as the group identifier of the first PDSCH group, and a New ACK-feedback group Indicator (NFI) of the second PDSCH group is different from an NFI of the first PDSCH group.

In addition, the terminal device may also determine that the second PDSCH carries newly transmitted data based on a New Data Indicator (NDI) of the second PDSCH being different from an NDI of the first PDSCH.

The above examples are some optional implementations for the terminal device to perform S330. The present disclosure is not limited to any specific implementation in which the terminal device determines that the second PDSCH group is different from the first PDSCH group and that the second PDSCH carries the newly transmitted data.

In the following, several communication methods according to the present disclosure will be introduced with reference to FIG. 4.

Figure 4:
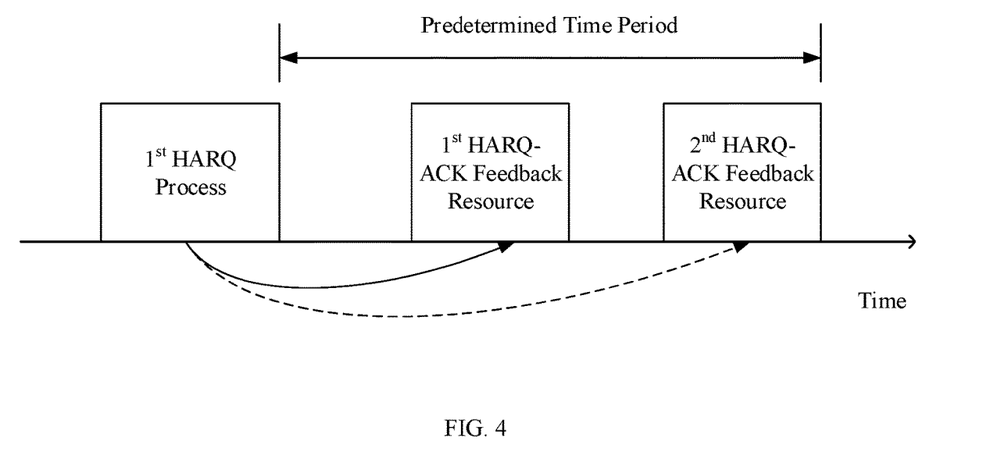
FIG. 4 is a schematic diagram showing another communication scenario according to the present disclosure.

As illustrated in FIG. 4, after scheduling the first HARQ process to transmit the first PDSCH, the network device can indicate at least one feedback resource for the first HARQ process (two feedback resources are illustrated as an example in FIG. 4) for transmitting the feedback information for the first PDSCH in the first HARQ process. Here, the first HARQ-ACK feedback resource and the second HARQ-ACK feedback resource may be used to transmit feedback information for same PDSCH(s) or different PDSCHs. For example, the first PDSCH group may include four PDSCHs, the first HARQ-ACK feedback resource can be used to transmit the feedback information for the four PDSCHs, and the second HARQ-ACK feedback resource can be used to transmit the feedback information for six PDSCHs (including the four PDSCHs in the first PDSCH group).

It can be appreciated that the DCI for scheduling the first HARQ process and the DCI indicating the at least one feedback resource may be same DCI or different DCI. The terminal device may determine the at least one feedback resource based on DCI, or may determine the at least one feedback resource using other methods, and the present disclosure is not limited thereto. In addition, the HARQ-ACK feedback resource refers to the feedback resource used to transmit an ACK or NACK, and it is not necessary that the feedback resource can only be used to transmit the ACK. Similarly, the HARQ-ACK feedback information means an ACK or NACK.

For the terminal device and the network device, there may be the following cases.

Case 1: If the terminal device successfully receives the first HARQ process, or in other words, if the terminal device successfully receives the scheduling information for the first HARQ process, the terminal device may prepare the feedback information for the first PDSCH in the first HARQ process. Over the two HARQ-ACK feedback resources indicated by the network device, if the terminal device obtains channel access, the terminal device can transmit the feedback information for the first PDSCH over at least one HARQ-ACK feedback resource of the two HARQ-ACK feedback resources.

If the network device receives the feedback information transmitted by the terminal device over the HARQ-ACK feedback resource in FIG. 4 within the predetermined time period, the network device may not need to wait for the predetermined time period to lapse before scheduling the first HARQ process again to transmit the second PDSCH, thereby reducing the data transmission delay. Here, if the feedback information is an ACK, the second PDSCH can carry newly transmitted data, or if the feedback information is an NACK, the second PDSCH can carry retransmitted data or newly transmitted data. The group identifier, NDI, and NFI of the second PDSCH may be same as or different from the group identifier, NDI, and NFI of the first PDSCH.

If the network device fails to receive the feedback information transmitted by the terminal device within the predetermined time period (due to low channel quality, etc.), the network device can schedule the first HARQ process again to transmit the second PDSCH after the predetermined time period lapses, without waiting for the feedback information for the first PDSCH, thereby preventing the HARQ process from being occupied for a long time due to the low channel quality and other reasons. Here, the second PDSCH may carry retransmitted data or newly transmitted data, for example, retransmitted or newly transmitted transport blocks carried in the first PDSCH. The group identifier, NDI, and NFI of the second PDSCH may be same as or different from the group identifier, NDI, and NFI of the first PDSCH.

Case 2: If the terminal device successfully receives the first HARQ process, or in other words, if the terminal device successfully receives the scheduling information for the first HARQ process, the terminal device may prepare the feedback information for the first PDSCH in the first HARQ process. Over the two HARQ-ACK feedback resources indicated by the network device, if the terminal device does not have channel access, the terminal device cannot transmit the feedback information over the above two HARQ-ACK feedback resources.

Correspondingly, the network device cannot receive the feedback information from the terminal device over the two HARQ-ACK feedback resources, and the network device can schedule the first HARQ process again to transmit the second PDSCH after the end of the predetermined time period. Here, the second PDSCH may carry retransmitted data or newly transmitted data, for example, retransmitted or newly transmitted transport blocks carried in the first PDSCH. The group identifier, NDI, and NFI of the second PDSCH may be same as or different from the group identifier, NDI, and NFI of the first PDSCH.

If the terminal device successfully receives the scheduling information for the second PDSCH, the terminal device may discard the first PDSCH regardless of whether the feedback information for the first PDSCH has been transmitted or whether the first PDSCH has been successfully decoded.

With the above scheme, it is possible to prevent the HARQ process from being occupied for a long time due to channel congestion and other reasons.

Case 3: If the terminal device fails to successfully receive the first HARQ process, or in other words, if the terminal device does not successfully receive the scheduling information for the first HARQ process, the terminal device will not prepare the feedback information corresponding to the first PDSCH in the first HARQ process. Over the two HARQ-ACK feedback resources indicated by the network device, the terminal device will not transmit the feedback information, or if the terminal device provides the feedback based on the first PDSCH group over the above two HARQ-ACK feedback resources, it can set the feedback information corresponding to the first HARQ process as an NACK, that is, the feedback information corresponding to the first HARQ process can be filled with the NACK.

If the network device fails to receive the feedback information for the first HARQ process over the above two HARQ-ACK feedback resources, the network device may schedule the first HARQ process again to transmit the second PDSCH after the end of the predetermined time. Here, the second PDSCH may carry retransmitted data or newly transmitted data, for example, retransmitted or newly transmitted transport blocks carried in the first PDSCH. The group identifier, NDI, and NFI of the second PDSCH may be same as or different from the group identifier, NDI, and NFI of the first PDSCH.

In this way, it is possible to prevent the first HARQ process from being occupied for a long time due to loss of scheduled grant information at the terminal device and other reasons.

If the network device receives the NACK transmitted by the terminal device over the above two HARQ-ACK feedback resources, then, regardless of whether the NACK indicates that the terminal device has not successfully decoded the first PDSCH or that the terminal device has not received the scheduling information for the first PDSCH, the network device can schedule the first HARQ process again to transmit the second PDSCH without waiting for the predetermined time to lapse. Here, the second PDSCH may carry retransmitted data, for example, retransmitted transport blocks carried in the first PDSCH, such that the transmission of unsuccessfully transmitted data can be started as soon as possible.

The group identifier, NDI, and NFI of the second PDSCH may be same as or different from the group identifier, NDI, and NFI of the first PDSCH.

Some examples of the communication methods for feedback based on the predetermined time according to the present disclosure have been described above. In scenarios with HARQ-ARK feedback based on the predetermined time, or in some other communication scenarios based on HARQ-ARK feedback, the terminal device may receive at least two instances of DCI on the same time domain resource, and the terminal device needs to determine an order of the at least two instances of DCI so as to determine the timing of the HARQ-ARK feedback resource. In the following, the communication method for determining the order of the at least two instances of DCI according to the present disclosure will be introduced.

Figure 5:
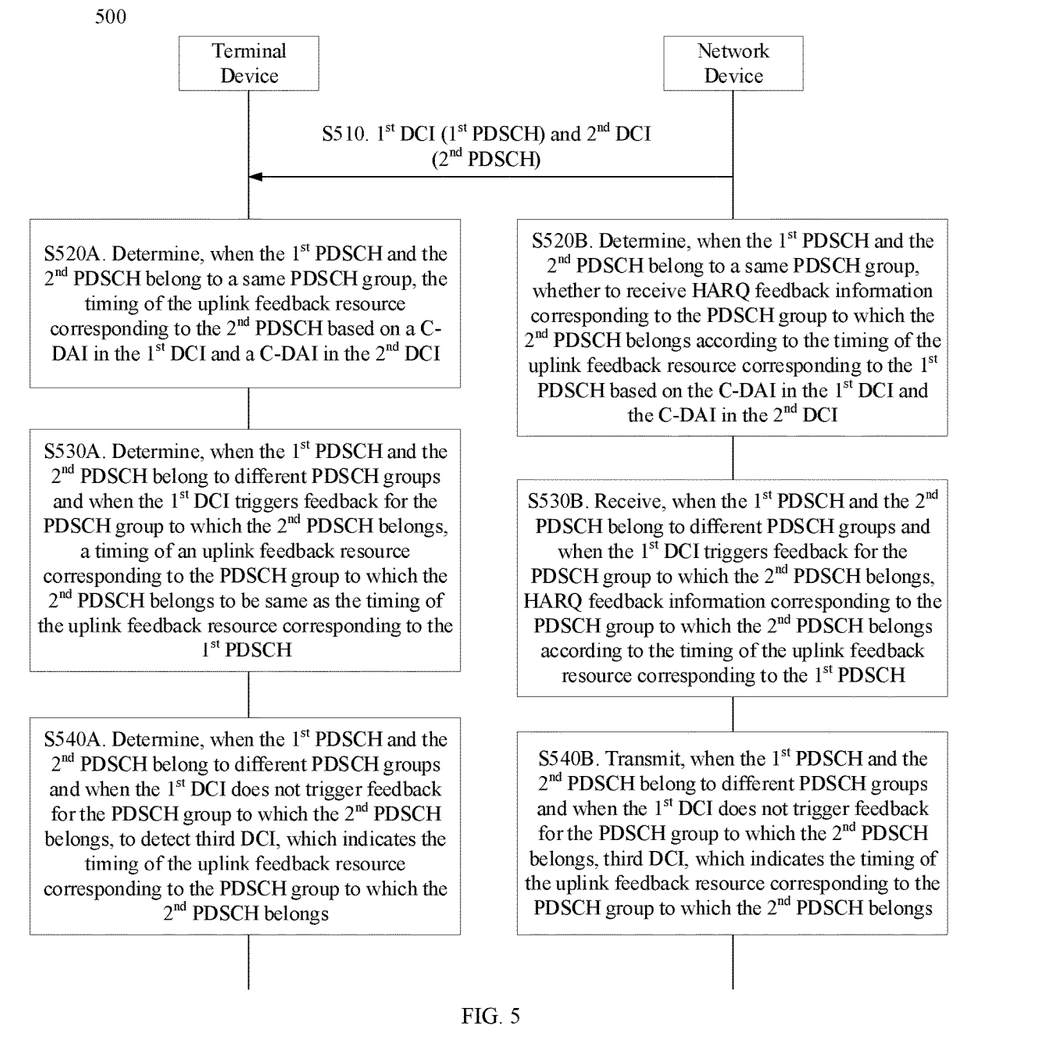
FIG. 5 is a schematic diagram showing another communication method according to the present disclosure.

As illustrated in FIG. 5, the method 500 includes at least part of the following content.

At S510, the terminal device receives first DCI and second DCI within a time unit n. The first DCI schedules a first PDSCH and the second DCI schedules a second PDSCH. The first DCI contains first indication information indicating a timing of an uplink feedback resource corresponding to the first PDSCH, and the second DCI contains second indication information indicating that a timing of an uplink feedback resource corresponding to the second PDSCH is to be determined.

Correspondingly, the network device transmits the above first DCI and second DCI within the time unit n.

The terminal device may receive the first DCI and the second DCI at a same PDCCH detection opportunity, or may alternatively receive the first DCI and the second DCI on a same symbol in a carrier aggregation scenario.

Next, the terminal device may perform one of the actions at blocks S520 to S540 based on different situations.

At S520A, when the first PDSCH and the second PDSCH belong to a same PDSCH group, the terminal device determines the timing of the uplink feedback resource corresponding to the second PDSCH based on a Counter Downlink Allocation Indicator (C-DAI) in the first DCI and a C-DAI in the second DCI.

Correspondingly, the network device performs S520B of determining whether to receive HARQ feedback information corresponding to the PDSCH group to which the second PDSCH belongs according to the timing of the uplink feedback resource corresponding to the first PDSCH based on the C-DAI in the first DCI and the C-DAI in the second DCI.

Figure 6:
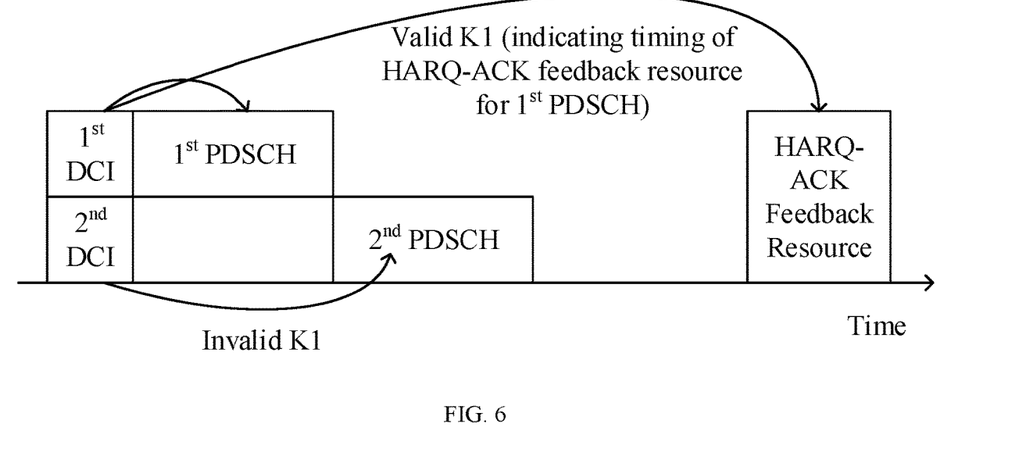
FIG. 6 is a schematic diagram showing yet another communication scenario according to the present disclosure.

The above solution will be described below with reference to FIG. 6. As illustrated in FIG. 6, the first DCI schedules the first PDSCH, and the second DCI schedules the second PDSCH. In at least one alternative embodiment, the first DCI also indicates the timing of the HARQ-ACK feedback resource corresponding to the first PDSCH via a valid K1, and the second DCI also indicates that the timing of the HARQ-ACK feedback resource corresponding to the second PDSCH is to be determined via an invalid K1.

When the group identifier of the first PDSCH and the group identifier of the second PDSCH are same, in one case, the C-DAI (i.e., C-DAI-1) in the first DCI is located before the C-DAI (i.e., C-DAI-2) in the second DCI in the order. For example, C-DAI-1 is equal to 0 and C-DAI-2 is equal to 1. In another case, the C-DAI (i.e., C-DAI-1) in the first DCI is located after the C-DAI (i.e., C-DAI-2) in the second DCI in the order. For example, C-DAI-1 is equal to 1 and C-DAI-2 is equal to 0.

In at least one alternative embodiment, for the former case, C-DAI-1 is located before C-DAI-2. Therefore, it can be considered that the first DCI is located before the second DCI in the order, and the first DCI cannot indicate the timing of the HARQ-ACK feedback resource corresponding to the second PDSCH. In this case, the terminal device can determine the timing of the HARQ-ACK feedback resource corresponding to the second PDSCH by detecting third DCI, which indicates the timing of the HARQ-ACK feedback resource corresponding to the second PDSCH or the PDSCH group to which the second PDSCH belongs. Correspondingly, the network device determines not to receive the feedback information for the PDSCH group to which the second PDSCH belongs according to the timing of the HARQ-ACK feedback resource corresponding to the first PDSCH, and the network device can transmit the above third DCI to the terminal device.

In at least one alternative embodiment, for the latter case, C-DAI-1 is located after C-DAI-2. Therefore, it can be considered that the first DCI is located after the second DCI in the order, and the first DCI can indicate the timing of the HARQ-ACK feedback resource corresponding to the second PDSCH. In this case, the terminal device may determine that the timing of the HARQ-ACK feedback resource corresponding to the PDSCH group to which the second PDSCH belongs is same as the timing of the HARQ-ACK feedback resource corresponding to the first PDSCH. Correspondingly, the network device determines to receive the feedback information corresponding to the PDSCH group to which the second PDSCH belongs according to the timing of the uplink feedback resource corresponding to the first PDSCH.

In at least one alternative embodiment, the terminal device does not expect the latter case. In other words, when the terminal device receives the first DCI and the second DCI within the same time unit, and when the group identifier of the first PDSCH and the group identifier of the second PDSCH are the same, the terminal device does not expect C-DAI-1 corresponding to the first DCI indicating the timing of the valid uplink feedback resource to be after C-DAI-2 corresponding to the second DCI indicating the timing of the invalid uplink feedback resource. The main reason is that if C-DAI-1 is after C-DAI-2, the network device can directly indicate a valid K1 for the terminal device, without indicating an invalid K.1.

In at least one alternative embodiment, when the terminal device receives the first DCI and the second DCI within the same time unit, and when the group identifier of the first PDSCH and the group identifier of the second PDSCH are the same, the terminal device and the network device can determine that C-DAI-1 is located before C-DAI-2, and there is no need to determine the order of these two parameters based on the values of C-DAI-1 and C-DAI2. Then, the terminal device can wait for the network device to transmit the third DCI.

At S530, when the first PDSCH and the second PDSCH belong to different PDSCH groups and when the first DCI triggers feedback for the PDSCH group to which the second PDSCH belongs, a timing of an uplink feedback resource corresponding to the PDSCH group to which the second PDSCH belongs is determined to be same as the timing of the uplink feedback resource corresponding to the first PDSCH.

Correspondingly, the network device performs S530B of receiving HARQ feedback information corresponding to the PDSCH group to which the second PDSCH belongs according to the timing of the uplink feedback resource corresponding to the first PDSCH. The timing of the HARQ-ACK feedback resource for the group to which the first PDSCH belongs can be determined according to the timing of the uplink feedback resource for the first PDSCH (that is, the content indicated by the valid K1). When the first DCI triggers the feedback for the PDSCH group to which the second PDSCH belongs, the timing of the HARQ-ACK feedback resource of the PDSCH group to which the second PDSCH belongs can also be determined according to the timing of the HARQ-ACK feedback resource for the first PDSCH (that is, the content indicated by the valid K1).

In at least one alternative embodiment, when the first PDSCH and the second PDSCH belong to different PDSCH groups, the terminal device does not expect the first DCI to trigger the feedback for the PDSCH group to which the second PDSCH belongs. The main reason is that in this case, the network device can directly indicate a valid K1 for the second DCI for the terminal device without indicating an invalid K1.

At S540, when the first PDSCH and the second PDSCH belong to different PDSCH groups and when the first DCI does not trigger feedback for the PDSCH group to which the second PDSCH belongs, it is determined to detect third DCI, which indicates the timing of the uplink feedback resource corresponding to the PDSCH group to which the second PDSCH belongs. Correspondingly, the network device performs S540B in which the network device transmits the above third DCI.

With the above actions at the blocks, the terminal device and the network device can have the same understanding of the order of at least two instances of DCI received in the same time unit. The terminal device and the network device can determine the feedback timing for the PDSCH group to which the second PDSCH belongs according to the timing of the HARQ-ACK feedback resource corresponding to the first PDSCH as indicated by the first DCI, or the terminal device can wait for a subsequent indication from the network device to indicate the feedback timing for the PDSCH group to which the second PDSCH belongs, thereby solving the problem regarding how to provide the HARQ-ACK feedback when at least two instances of DCI are received over the same time domain resource.

In at least one alternative embodiment, after determining the timing of the uplink feedback resource corresponding to the second PDSCH or determining the timing of the uplink feedback resource corresponding to the PDSCH group to which the second PDSCH belongs, the method may further include: determining whether to transmit feedback information on the uplink feedback resource corresponding to the second PDSCH based on processing time for the second PDSCH.

If the second PDSCH satisfies the processing delay, the terminal device may transmit the feedback information for the second PDSCH over the HARQ-ACK feedback resource corresponding to the PDSCH group to which the second PDSCH belongs. Alternatively, if the second PDSCH does not satisfy the processing delay, then the terminal device may not transmit the feedback information for the second PDSCH over the HARQ-ACK feedback resource corresponding to the PDSCH group to which the second PDSCH belongs.

The processing delay being satisfied as described above can be understood as, for example, that for the period from the time unit for receiving the second PDSCH to the time unit where the HARQ-ACK feedback resource is located, the terminal device can complete the decoding of the second PDSCH within the period and can generate feedback information corresponding to the second PDSCH.

The example of the communication method according to the present disclosure has been described in detail above. It can be appreciated that, in order to achieve the above functions, the communication apparatus may include hardware structures and/or software modules for executing the respective functions correspondingly. It can be appreciated by those skilled in the art that, given the units and algorithm steps of the examples described in the embodiments disclosed herein, the present disclosure can be implemented in the form of hardware or a combination of hardware and computer software. Whether a certain function is performed by hardware or computer software that drives hardware depends on the specific application and design constraint conditions of the technical solution. Those skilled in the art can use different methods to implement the described functions for each specific application, and such implementation should not be considered as beyond the scope of the present disclosure.

In the present disclosure, the communication apparatus may be divided into functional units according to the above method example. For example, the functions may be divided into functional units, or two or more functions may be integrated into one processing unit. The above integrated unit can be implemented in the form of hardware or software functional unit. It is to be noted that the division of units in the present disclosure is illustrative only, and is only a logical function based division, and there may be other divisions in actual implementations.

Figure 7:
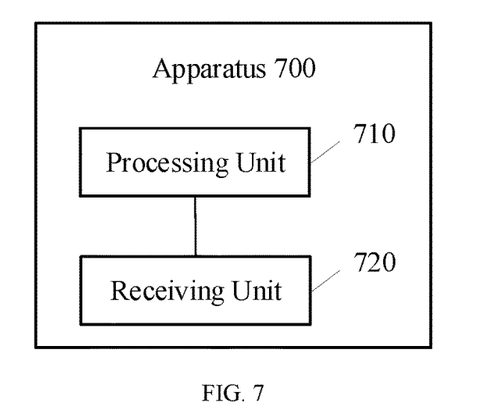
FIG. 7 is a schematic diagram showing a communication apparatus according to the present disclosure.

FIG. 7 is a schematic diagram illustrating a structure of a communication apparatus according to the present disclosure. The apparatus 700 includes a processing unit 710 and a receiving unit 720, and the processing unit 710 can control the receiving unit 720 to perform a receiving step.

The receiving unit 720 is configured to receive a first PDSCH within a time unit n. The first PDSCH belongs to a first HARQ process, the first PDSCH belongs to a first PDSCH group, and n is an integer greater than or equal to 0.

The processing unit 710 is configured to expect to receive no second PDSCH within a predetermined time period after the time unit n, the second PDSCH belonging to the first HARQ process.

Or, the receiving unit 720 is further configured to receive the second PDSCH, the second PDSCH belonging to the first HARQ process. The second PDSCH belongs to a second PDSCH group different from the first PDSCH group; and/or a transport block carried in the second PDSCH is different from a transport block carried in the first PDSCH.

In at least one alternative embodiment, the second PDSCH group being different from the first PDSCH group may include: a group identifier of the second PDSCH group being different from a group identifier of the first PDSCH group; or the group identifier of the second PDSCH group being same as the group identifier of the first PDSCH group, and an NFI of the second PDSCH group being different from an NFI of the first PDSCH group.

In at least one alternative embodiment, the transport block carried in the second PDSCH being different from the transport block carried in the first PDSCH may include: an NDI of the second PDSCH being different from an NDI of the first PDSCH.

In at least one alternative embodiment, the processing unit 710 may be further configured to: determine, prior to receiving the second PDSCH, a time unit n+k as a time unit for transmitting HARQ feedback information for the first PDSCH group, where k is an integer greater than or equal to 0.

In at least one alternative embodiment, the predetermined time period may include: predetermined time starting from the time unit n; or predetermined time starting from the time unit n+k.

In at least one alternative embodiment, the predetermined time period may have a time length dependent on a time interval between the time unit n and the time unit n+k; or the predetermined time period may have a time length dependent on a time interval between the time unit n+k and a time unit n+k+m, the time unit n+k+m being later than the time unit n+k in time domain, the time unit n+k+m being a time unit for transmitting HARQ feedback information for the first PDSCH group, where m is an integer greater than or equal to 0.

In at least one alternative embodiment, the predetermined time period may include predetermined time starting from the time unit n.

In at least one alternative embodiment, the receiving unit 720 may be further configured to: receive the second PDSCH after the predetermined time period, the second PDSCH belonging to the first HARQ process.

In at least one alternative embodiment, the processing unit 710 may be further configured to: discard a decoding result for the first PDSCH after receiving the second PDSCH.

For the details regarding how the apparatus 700 performs the communication method and the advantageous effects produced, reference may be made to the related description in the method embodiment.

Figure 8:
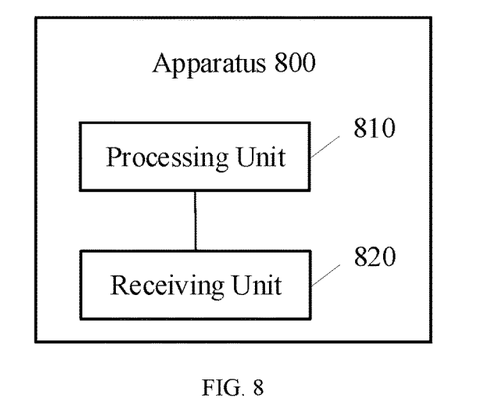
FIG. 8 is a schematic diagram showing another communication apparatus according to the present disclosure.

FIG. 8 is a schematic diagram illustrating a structure of another communication apparatus according to the present disclosure. The apparatus 800 includes a processing unit 810 and a receiving unit 820, and the processing unit 810 can control the receiving unit 820 to perform a receiving step.

The receiving unit 820 is configured to receive first DCI and second DCI within a time unit n. The first DCI schedules a first PDSCH, the second DCI schedules a second PDSCH, the first DCI contains first indication information indicating a timing of an uplink feedback resource corresponding to the first PDSCH, and the second DCI contains second indication information indicating that a timing of an uplink feedback resource corresponding to the second PDSCH is to be determined.

The processing unit 810 is configured to determine, when the first PDSCH and the second PDSCH belong to a same PDSCH group, the timing of the uplink feedback resource corresponding to the second PDSCH based on a C-DAI in the first DCI and a C-DAI in the second DCI.

Or, the processing unit 810 is configured to determine, when the first PDSCH and the second PDSCH belong to different PDSCH groups and when the first DCI triggers feedback for the PDSCH group to which the second PDSCH belongs, a timing of an uplink feedback resource corresponding to the PDSCH group to which the second PDSCH belongs to be same as the timing of the uplink feedback resource corresponding to the first PDSCH.

Or, the processing unit 810 is configured to determine, when the first PDSCH and the second PDSCH belong to different PDSCH groups and when the first DCI does not trigger feedback for the PDSCH group to which the second PDSCH belongs, to detect third DCI, the third DCI indicating the timing of the uplink feedback resource corresponding to the PDSCH group to which the second PDSCH belongs.

In at least one alternative embodiment, the processing unit 810 may be configured to: determine, when the C-DAI in the first DCI is located before the C-DAI in the second DCI, the timing of the uplink feedback resource corresponding to the second PDSCH by detecting the third DCI, the third DCI indicating the timing of the uplink feedback resource corresponding to the PDSCH group to which the second PDSCH belongs; or determine, when the C-DAI in the first DCI is located after the C-DAI in the second DCI, the timing of the uplink feedback resource corresponding to the second PDSCH to be same as the timing of the uplink feedback resource corresponding to the first PDSCH.

In at least one alternative embodiment, the processing unit 810 may be further configured to, subsequent to determining the timing of the uplink feedback resource corresponding to the second PDSCH or determining the timing of the uplink feedback resource corresponding to the PDSCH group to which the second PDSCH belongs: determine whether to transmit HARQ feedback information for the second PDSCH on the uplink feedback resource based on processing time for the second PDSCH.

For the details regarding how the apparatus 800 performs the communication method and the advantageous effects produced, reference may be made to the related description in the method embodiment.

Figure 9:
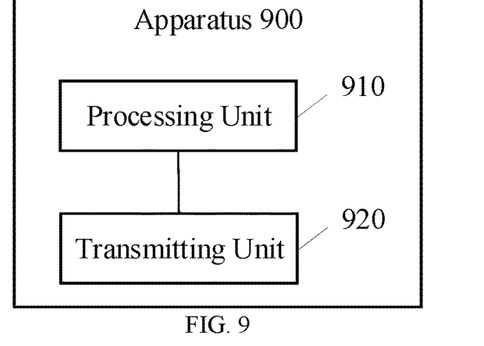
FIG. 9 is a schematic diagram showing yet another communication apparatus according to the present disclosure.

FIG. 9 is a schematic diagram illustrating a structure of yet another communication apparatus according to the present disclosure. The apparatus 900 includes a processing unit 910 and a transmitting unit 920, and the processing unit 910 can control the transmitting unit 920 to perform a transmitting step.

The transmitting unit 920 is configured to transmit a first PDSCH in a time unit n, the first PDSCH belonging to a first HARQ process and the first PDSCH belonging to a first PDSCH group, where n is an integer greater than or equal to 0.

The processing unit 910 is configured to determine not to transmit a second PDSCH within a predetermined time period after the time unit n, the second PDSCH belonging to the first HARQ process.

Or, the transmitting unit 920 is further configured to transmit the second PDSCH after the predetermined time period after the time unit n, the second PDSCH belonging to the first HARQ process.

Or, the transmitting unit 920 is further configured to transmit the second PDSCH. The second PDSCH belongs to the first HARQ process, the second PDSCH belongs to a second PDSCH group different from the first PDSCH group; and/or a transport block carried in the second PDSCH is different from a transport block carried in the first PDSCH.

In at least one alternative embodiment, the second PDSCH group being different from the first PDSCH group may include: a group identifier of the second PDSCH group being different from a group identifier of the first PDSCH group; or the group identifier of the second PDSCH group being same as the group identifier of the first PDSCH group, and an NFI of the second PDSCH group being different from an NFI of the first PDSCH group.

In at least one alternative embodiment, the transport block carried in the second PDSCH being different from the transport block carried in the first PDSCH may include: an NDI of the second PDSCH being different from an NDI of the first PDSCH.

In at least one alternative embodiment, the processing unit 910 may be further configured to: determine, prior to transmitting the second PDSCH, a time unit n+k as a time unit for receiving HARQ feedback information for the first PDSCH group, where k is an integer greater than or equal to 0.

In at least one alternative embodiment, the apparatus 900 may further include a receiving unit configured to receive the HARQ feedback information for the first PDSCH in the time unit n+k.

In at least one alternative embodiment, the predetermined time period may include: predetermined time starting from the time unit n; or predetermined time starting from the time unit n+k.

In at least one alternative embodiment, the predetermined time period may have a time length dependent on a time interval between the time unit n and the time unit n+k; or the predetermined time period may have a time length dependent on a time interval between the time unit n+k and a time unit n+k+m, the time unit n+k+m being later than the time unit n+k in time domain, the time unit n+k+m being a time unit for transmitting HARQ feedback information for the first PDSCH group, where m is an integer greater than or equal to 0.

In at least one alternative embodiment, the predetermined time period may include: predetermined time starting from the time unit n.

In at least one alternative embodiment, the processing unit 910 may be configured to: refrain from transmitting the second PDSCH within the predetermined time period after the time unit n, wherein no HARQ feedback information for the first PDSCH is received within the predetermined time period, and the second PDSCH belongs to the first HARQ process.

For the details regarding how the apparatus 900 performs the communication method and the advantageous effects produced, reference may be made to the related description in the method embodiment.

Figure 10:
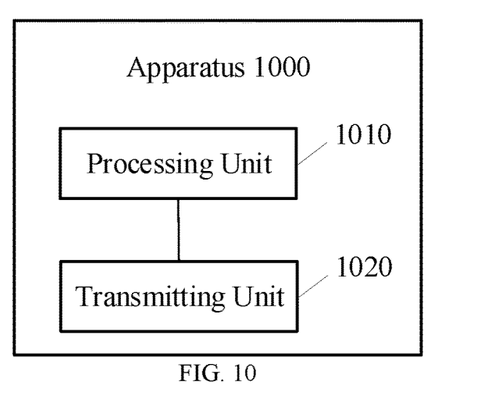
FIG. 10 is a schematic diagram showing still another communication apparatus according to the present disclosure.

FIG. 10 is a schematic diagram illustrating a structure of still another communication apparatus according to the present disclosure. The apparatus 1000 includes a processing unit 1010 and a transmitting unit 1020, and the processing unit 1010 can control the transmitting unit 1020 to perform a transmitting step.

The transmitting unit 1020 is configured to transmit first DCI and second DCI within a time unit n. The first DCI schedules a first PDSCH, the second DCI schedules a second PDSCH, the first DCI contains first indication information indicating a timing of an uplink feedback resource corresponding to the first PDSCH, and the second DCI contains second indication information indicating that a timing of an uplink feedback resource corresponding to the second PDSCH is to be determined.

The processing unit 1010 is configured to determine, when the first PDSCH and the second PDSCH belong to a same PDSCH group, whether to receive HARQ feedback information corresponding to the PDSCH group to which the second PDSCH belongs according to the timing of the uplink feedback resource corresponding to the first PDSCH based on a C-DAI in the first DCI and a C-DAI in the second DCI.

Or, the processing unit 1010 is configured to determine, when the first PDSCH and the second PDSCH belong to different PDSCH groups and when the first DCI triggers feedback for the PDSCH group to which the second PDSCH belongs, to receive HARQ feedback information corresponding to the PDSCH group to which the second PDSCH belongs according to the timing of the uplink feedback resource corresponding to the first PDSCH.

Or, the processing unit 1010 is configured to determine, when the first PDSCH and the second PDSCH belong to different PDSCH groups and when the first DCI does not trigger feedback for the PDSCH group to which the second PDSCH belongs, to transmit third DCI, the third DCI indicating the timing of the uplink feedback resource corresponding to the PDSCH group to which the second PDSCH belongs.

In at least one alternative embodiment, the processing unit 1010 may be configured to: determine, when the C-DAI in the first DCI is located before the C-DAI in the second DCI, not to receive the HARQ feedback information corresponding to the PDSCH group to which the second PDSCH belongs according to the timing of the uplink feedback resource corresponding to the first PDSCH; or determine, when the C-DAI in the first DCI is located after the C-DAI in the second DCI, to receive the HARQ feedback information corresponding to the PDSCH group to which the second PDSCH belongs according to the timing of the uplink feedback resource corresponding to the first PDSCH.

In at least one alternative embodiment, the processing unit 1010 may be further configured to, when the C-DAI in the first DCI is located before the C-DAI in the second DCI: determine to transmit the third DCI, the third DCI indicating the timing of the uplink feedback resource corresponding to the PDSCH group to which the second PDSCH belongs.

For the details regarding how the apparatus 1000 performs the communication method and the advantageous effects produced, reference may be made to the related description in the method embodiment.

Figure 11:
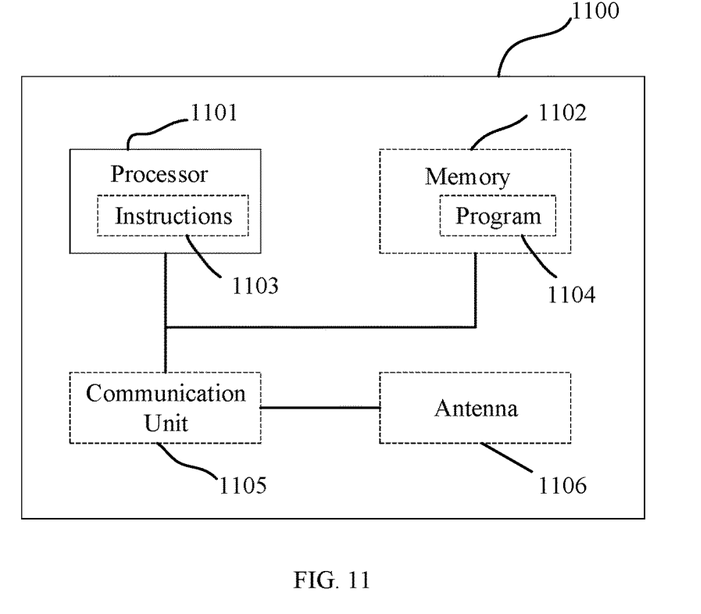
FIG. 11 is a schematic diagram showing a communication device according to the present disclosure.

FIG. 11 illustrates a schematic diagram showing a structure of a communication device according to the present disclosure. The dotted line in FIG. 11 indicates that a unit or module is optional. The device 1100 may be configured to implement the methods described in the above method embodiments. The device 1100 may be a terminal device or a network device or a chip.

The device 1100 includes one or more processors 1101, and the one or more processors 1101 can enable the device 1100 to implement the methods in the method embodiments corresponding to FIGS. 3 to 13. The processor 1101 may be a general-purpose processor or a special-purpose processor.

For example, the processor 1101 may be a Central Processing unit (CPU). The CPU can be configured to control the device 1100 to execute a software program and process data of the software program. The device 1100 may further include a communication unit 1105 configured to implement signal input (reception) and output (transmission).

For example, the device 1100 may be a chip, and the communication unit 1105 may be an input and/or output circuit of the chip, or the communication unit 1105 may be a communication interface of the chip. The chip may be used as a component of a terminal device or a network device or another wireless communication device.

In another example, the device 1100 may be a terminal device or a network device, and the communication unit 1105 may be a transceiver of the terminal device or the network device, or the communication unit 1105 may be a transceiver circuit of the terminal device or the network device.

The device 1100 may include one or more memories 1102, having a program 1104 stored thereon. The program 1104 may be executed by the processor 1101 to generate instructions 1103, such that the processor 1101 can perform the methods described in the above method embodiments according to the instructions 1103. In at least one alternative embodiment, the memories 1102 may also store data. In at least one alternative embodiment, the processor 1101 may also read the data stored in the memories 1102, and the data may be stored at the same storage address as the program 1104, or the data may be stored at a different storage address from the program 1104.

The processor 1101 and the memories 1102 may be provided separately or integrated, for example, integrated on a System on Chip (SOC) of the terminal device.

The device 1100 may also include an antenna 1106. The communication unit 1105 may be configured to implement the transmitting and receiving functions of the device 1100 via the antenna 1106.

For the details of the processor 1101 to perform the communication method and the advantageous effects that can be provided, reference can be made to the related description in the method embodiments.

It can be appreciated that the actions at the blocks in the above method embodiments may be implemented by a logic circuit in the form of hardware or instructions in the form of software in the processor 1101. For example, the processor 1101 may be a CPU, a Digital Signal Processor (DSP), an Application Specific Integrated Circuit (ASIC), a Field Programmable Gate Array (FPGA), or any other programmable logic device, such as a discrete gate, a transistor logic device, or a discrete hardware component.

The present disclosure also provides a computer program product which, when executed by the processor 1101, implements the method described in any method embodiment of the present disclosure.

The computer program product may be stored in the memories 1102. For example, it may be the program 1104, which may be finally converted into an executable object file that can be executed by the processor 1101 after subjected to processes such as preprocessing, compilation, assembly, and linking.

The present disclosure also provides a computer-readable storage medium having a computer program stored thereon. The computer program, when executed by a computer, implements the method described in any of the method embodiment of the present disclosure. The computer program can be a high-level language program or an executable object program.

The computer-readable storage medium may be the memories 1102, which may include volatile memories, non-volatile memories, or both. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which can be used as an external cache. As non-limiting examples, various forms of RAMs are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM).

It can be appreciated by those skilled in the art that, for the details of the operation process of the above-described device and apparatus and the technical effects that can be provided by the above-described device and apparatus, reference can be made to the corresponding process and technical effects in the above method embodiments, and the description thereof will be omitted for convenience and conciseness.

The systems, apparatuses, and methods according to the embodiments of the present disclosure may be implemented in other ways. For example, some features in the above described method embodiments can be ignored or omitted. The apparatus embodiments described above are illustrative only. For example, the divisions of the units are only divisions based on logical functions, and there may be other divisions in actual implementations. For example, more than one unit or component may be combined or integrated into another system. In addition, the coupling between the units or between the components may be direct coupling or indirect coupling, which may be electrical, mechanical, or in any other forms.

It can be appreciated that, in the various method embodiments of the present disclosure, the values of the sequence numbers of the above processes does not mean the order in which they are performed. The order in which the respective processes are to be performed should be determined by their functions and internal logics, and should not constitute any limitation on the implementation of the embodiments of the present disclosure.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In summary, while the preferred embodiments of the technical solutions according to the present disclosure have been described above, they are not intended to limit the scope of the present disclosure. Any modifications, equivalents and improvements that are made without departing from the spirit and principle of the present disclosure are to be encompassed by the scope of the present disclosure.

What is claimed is:

1. A communication method, comprising:
   receiving first Downlink Control Information (DCI) and second DCI within a time unit n, the first DCI scheduling a first Physical Downlink Shared Channel (PDSCH), the second DCI scheduling a second PDSCH, the first DCI containing first indication information indicating a timing of an uplink feedback resource corresponding to the first PDSCH, and the second DCI containing second indication information indicating that a timing of an uplink feedback resource corresponding to the second PDSCH is to be determined; and determining, when the first PDSCH and the second PDSCH belong to a same PDSCH group, the timing of the uplink feedback resource corresponding to the second PDSCH based on a Counter Downlink Allocation Indicator (C-DAI) in the first DCI and a C-DAI in the second DCI, wherein said determining the timing of the uplink feedback resource corresponding to the second PDSCH based on the C-DAI in the first DCI and the C-DAI in the second DCI comprises:

determining, when the C-DAI in the first DCI is located before the C-DAI in the second DCI, the timing of the uplink feedback resource corresponding to the second PDSCH by detecting a third DCI, the third DCI indicating the timing of the uplink feedback resource corresponding to the PDSCH group to which the second PDSCH belongs; or determining, when the C-DAI in the first DCI is located after the C-DAI in the second DCI, the timing of the uplink feedback resource corresponding to the second PDSCH to be same as the timing of the uplink feedback resource corresponding to the first PDSCH.

2. The method according to claim 1, further comprising, subsequent to determining the timing of the uplink feedback resource corresponding to the second PDSCH:

determining whether to transmit HARQ feedback information for the second PDSCH on the uplink feedback resource based on processing time for the second PDSCH.

3. A terminal device, comprising a processor and a memory, wherein the memory is configured to store a computer program, and the processor is configured to invoke and execute the computer program stored in the memory, to perform the method according to claim 1.

4. The terminal device according to claim 3, wherein the processor is further configured to invoke and execute the computer program stored in the memory to, subsequent to determining the timing of the uplink feedback resource corresponding to the second PDSCH:

determine whether to transmit HARQ feedback information for the second PDSCH on the uplink feedback resource based on processing time for the second PDSCH.

5. A network device, comprising a processor and a memory, wherein the memory is configured to store a computer program, and the processor is configured to invoke and execute the computer program stored in the memory, to:

transmit first Downlink Control Information (DCI) and second DCI within a time unit n, the first DCI scheduling a first Physical Downlink Shared Channel (PDSCH), the second DCI scheduling a second PDSCH, the first DCI containing first indication information indicating a timing of an uplink feedback resource corresponding to the first PDSCH, and the second DCI containing second indication information indicating that a timing of an uplink feedback resource corresponding to the second PDSCH is to be determined; and determine, when the first PDSCH and the second PDSCH belong to a same PDSCH group, whether to receive HARQ feedback information corresponding to the PDSCH group to which the second PDSCH belongs according to the timing of the uplink feedback resource corresponding to the first PDSCH based on a Counter Downlink Allocation Indicator (C-DAI) in the first DCI and a C-DAI in the second DCI, wherein determining whether to receive the HARQ feedback information corresponding to the PDSCH group to which the second PDSCH belongs according to the timing of the uplink feedback resource corresponding to the first PDSCH based on the C-DAI in the first DCI and the C-DAI in the second DCI comprises:

determining, when the C-DAI in the first DCI is located before the C-DAI in the second DCI, not to receive the HARQ feedback information corresponding to the PDSCH group to which the second PDSCH belongs according to the timing of the uplink feedback resource corresponding to the first PDSCH; or determining, when the C-DAI in the first DCI is located after the C-DAI in the second DCI, to receive the HARQ feedback information corresponding to the PDSCH group to which the second PDSCH belongs according to the timing of the uplink feedback resource corresponding to the first PDSCH.

6. The network device according to claim 5, wherein the processor is further configured to invoke and execute the computer program stored in the memory to, subsequent to determining the timing of the uplink feedback resource corresponding to the second PDSCH:

determine whether to transmit HARQ feedback information for the second PDSCH on the uplink feedback resource based on processing time for the second PDSCH.

* * * * *